United States Patent [19]

Maeda

[11] Patent Number: 4,739,131
[45] Date of Patent: Apr. 19, 1988

[54] TURN INDICATOR SWITCH CANCELLING MECHANISM

[75] Inventor: Takuya Maeda, Furukawa, Japan

[73] Assignee: Alps Electric Co., Ltd., Japan

[21] Appl. No.: 21,142

[22] Filed: Mar. 3, 1987

[30] Foreign Application Priority Data

Jun. 16, 1986 [JP] Japan .............................. 61-90550[U]

[51] Int. Cl.[4] .............................................. H01H 3/16
[52] U.S. Cl. ................................ 200/61.27; 200/61.3; 200/61.34; 200/61.35
[58] Field of Search ................. 200/61.27, 61.3, 61.34, 200/61.35, 61.54

[56] References Cited

U.S. PATENT DOCUMENTS

| | | | |
|---|---|---|---|
| 3,914,566 | 10/1975 | Wendling | 200/61.27 |
| 4,036,817 | 7/1977 | Wilkinson | 200/61.27 |
| 4,503,296 | 3/1985 | Iwata et al. | 200/61.27 |
| 4,647,736 | 3/1987 | Furuhashi et al. | 200/61.27 |

*Primary Examiner*—J. R. Scott
*Attorney, Agent, or Firm*—Guy W. Shoup

[57] ABSTRACT

A turn indicator switch cancelling mechanism wherein the motion of a cam member moved by the projection of a cancelling cam is transmitted to a drive member via a slider engaging therewith so that a switch activating member and an operating lever are reliably moved back to their neutral positions by engagement between the drive member and the cam member.

4 Claims, 7 Drawing Sheets

TURN INDICATOR SWITCH CANCELLING MECHANISM

FIELD OF THE INVENTION

This invention relates to a turn indicator switch of a car, and more particularly to a cancelling mechanism for automatically returning an operating lever to its neutral position.

BACKGROUND OF THE INVENTION

There are a number of turn indicator switches one of which is shown in FIGS. 8 through 12.

FIG. 8 is an exploded view of major parts of a turn indicator switch in which reference numeral 1 refers to a case mounted on a steering cover (not shown), 2 to a switch activating member mounted in a chamber 1a defined by the case 1, 3 to an operating lever connected to the switch activating member 2 and exposed through the case 1, and 4 to a cover closing the chamber 1a and fixed to the case 1. The switch activating member 2 has on an upper surface thereof a beveled cam 5 and offset recesses 6. The switch activating member 2 is also provided along its outer vertical walls with two blind bores 7, of which only one is illustrated. Reference numeral 8 designates a cam plate engaging the offset recesses 6 and movable therein back and forth. The cam plate 8 is biased in its advancing direction by a pair of springs 9 having a relatively large resiliency, and is reliably held in the offset recesses 6 by a pair of stopper plates 10 fixed to the switch activating member 2 by screws. Reference numeral 11 denotes a drive member slidably engaging the blind bores 7 and biased outwardly by springs 12.

The case 1 has a cam surface inwardly projecting from its inner wall surface to guide slidably movements of the drive member 11 therealong. Reference numeral 14 denotes a cam member having a pair of projections 14a on the upper surface thereof and having an engaging pin 14b on the bottom surface thereof. The cam member 14 is biased forwardly by a spring 15 having both ends fixed to the cover 4. The projections 14a of the cam member 14 are accepted in arcuate guide holes 4a formed in the cover 4. The engaging pin 14b of the cam member 14 contacts tapered cam surfaces of the beveled cam 5.

FIGS. 9 through 12 are plan views illustrating the turn indicator switch mounted on a steering assembly. In these drawings, reference numeral 16 refers to a steering shaft, and 17 to a cancelling cam co-rotatable with the steering shaft 16 and having two projections 17a at 180 degrees interval.

As shown in FIG. 9, when the operating lever 3 takes its neutral position, the engaging pin 14b of the cam member 14 engages the summit of the triangle cam 5 to maintain the cam member 14 at its retracted position outside the rotation orbit of the projections 17a of the cancelling cam 17 against the energy of the spring 15. Therefore, regardless of rotation of a steering wheel (not shown), the projections 17a of the cancelling-cam never contact the cam member 14, and the switch activating member 2 and the operating lever 3 are maintained at their neutral positions.

Referring to FIG. 10, when the operating lever 3 is rotated in a direction shown by arrow A, for example, from the neutral position, upper one of the drive members 11, hereinafter designated by 11a whereas the lower drive member is denoted by 11b, moves beyond a ridgeline of the cam surface 13. Therefore, the switch activating member 2 and the operating lever 3 are locked there, and a left-turn or right-turn switch (not shown) is activated. This rotation of the switch activating member 2 changes the positional relationship between the triangle cam 5 and the cam plate 14. Therefore, the spring 15 in FIG. 8 biases the cam plate 14 to move the engaging pin 14b away from the summit of the stopper cam 5 along one of side slopes thereof. Therefore, the cam plate 14 projects through the case 1 into the orbit of the projections 17a.

Referring to FIG. 11, when the steering wheel is rotated back to its original position in a direction shown by arrow B in the drawing, the cam member 14 in its projecting position contacts one of the projections 17a of the cancelling cam 17 during the return movement of the steering wheel. Due to this, the cam member 14 rotates in arrow C direction about the lower one of the projections 14a in the drawing and urges one end portion of the cam plate 8. Since the cam plate 8 is connected to the switch activating member 2 via the springs 9 having a relatively large energy, the cam plate 8, switch activating member 2 and operating lever 3 rotate together clockwisely in the drawing to their neutral positions. This is just the cancelling motion.

On the other hand, when a driver commences a returning rotation of the steering wheel from the configuration of FIG. 9 while holding the operating lever 3 in order to continue a turn indicating flashing after a return motion of the steering wheel to its neutral position due to a caster effect, the cam member 14 contacts one of the projections 17a of the cancelling cam 17 in the same returning motion, and rotates in arrow C direction. In this case, since the operating lever 3 and the switch activating member 2 are fixed by the driver, the energy applied from the cam member 14 to the cam plate 8 is absorbed by contraction of the lower spring 9 in the drawing, and no power for cancelling operation is transmitted to the operating lever 3. When the cancelling cam 17 further rotates in arrow B direction in FIG. 12 until the steering wheel reaches its neutral position, the projection 17a of the cancelling cam 17 moves apart from the cam member 14, and the operating lever 3 is maintained in the locked condition of FIG. 10 also after the driver removes his hand from the operating lever 3.

As explained above, turn indicator switches in general include a cancelling mechanism to automatically return an operating lever from a locked position to its neutral position upon a return movement of a steering wheel. This cancelling mechanism requires a safety function to establish engagement or disengagement between the cam member 14 and the cancelling cam 17 while fixing the operating lever 3 at its locked condition.

In this connection, the prior art employ relatively stubborn springs 9 to connect the cam plate 8 to the switch activating member 2. However, it is very difficult to make the energy of the springs 9 uniform, and prior art cancelling mechanisms often invite a malfunction caused by uneven strengths of the springs 9 in cancelling action. More specifically, if the springs 9 are stubborn, they cannot sufficiently absorb the energy of the cam member 14 applied to the cam plate 8, and the resetting force is applied to the cam plate 8 and the cam member 14, and often destroys them. On the other hand, if the springs 9 are weak, they also contract upon a cancelling operation, and cannot transmit the energy of the cam member 14 to the switch activating member 2. This invites unreliable cancelling motion of the system.

Beside this, the prior art cancelling mechanism requiring the springs 9 is expensive due to a larger number of parts or members, and requires an increased effort in its assembling process to forcibly contract the stubborn springs 9 to insert them between the cam plate 8 and the switch activating member 2.

OBJECT OF THE INVENTION

It is therefore an object of the invention to provide a turn indicator switch cancelling mechanism which effects a reliable cancelling motion and can be manufactured at a lower cost and by an easier assembling process.

SUMMARY OF THE INVENTION

According to the invention, there is provided a turn indicator switch cancelling mechanism including a switch activating member rotated by an operating lever, drive members conjoined with said switch activating member via springs, a cam means cooperating with said drive members to lock said operating lever at first and second operative positions and at a neutral position, and a cam member driven by a projection of a steering shaft to automatically return said operating lever from said first or second operative position to said neutral position, and characterized in that said switch activating member includes a slider driven by said cam member to selectively move said drive members against said springs.

With this arrangement, the motion of the cam member moved by the projections of the cancelling cam is transmitted to the drive member via the slider engaging therewith. Therefore, the switch activating member and the operating lever are reliably moved back to their neutral positions by engagement between the drive member and the cam means.

BRIEF DESCRIPTION OF THE DRAWINGS

FIGS. 1 through 7 illustrate an arrangement of a turn indicator switch cancelling mechanism embodying the invention, in which FIG. 1 is an exploded view of some important members of a turn indicator switch; FIG. 2 is a bottom view of a cover and a cam member conjoined together; and FIGS. 3, 4, 5, 6 and 7 are plan views showing different operating configurations of the turn indicator switch, and FIGS. 8 through 12 illustrate a prior art turn indicator switch, in which FIG. 8 is an exploded view of major parts of the switch, and FIGS. 9, 10, 11 and 12 are plan views showing different operating configurations of the switch.

DETAILED DESCRIPTION

The invention is hereinbelow described in detail, referring to a preferred embodiment illustrated in FIGS. 1 through 7.

Figure 1:
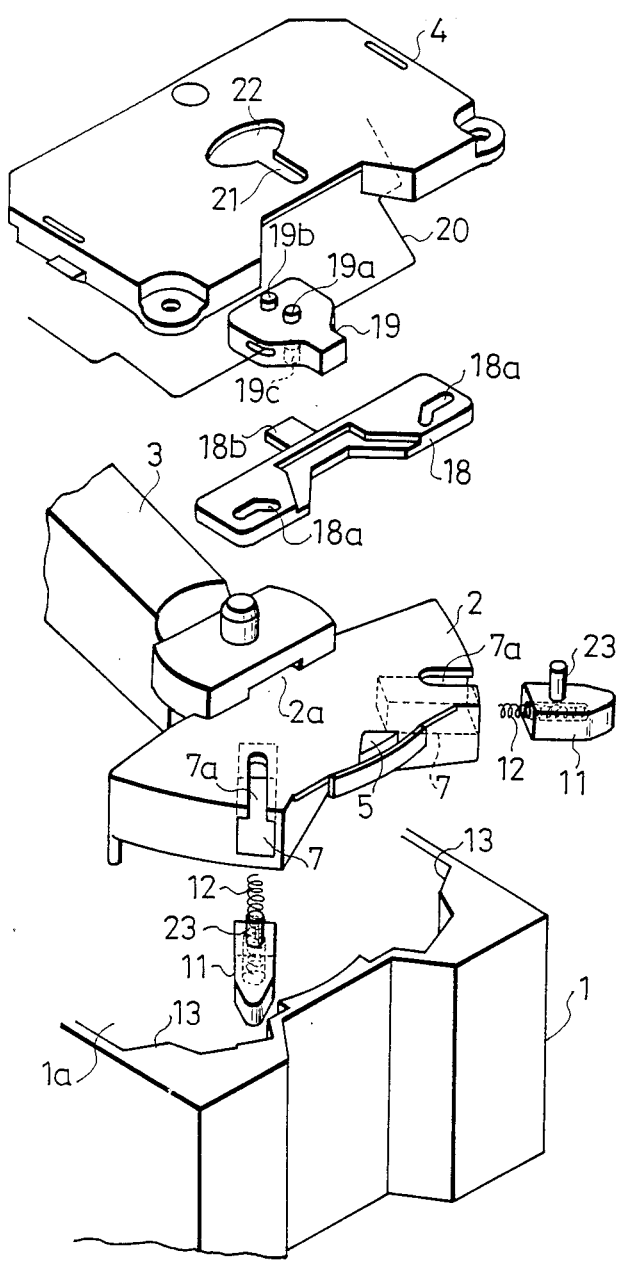
Figure 2:
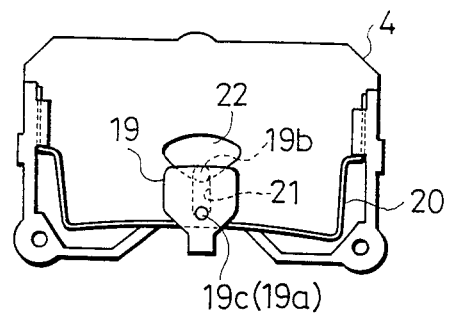
Figure 3:
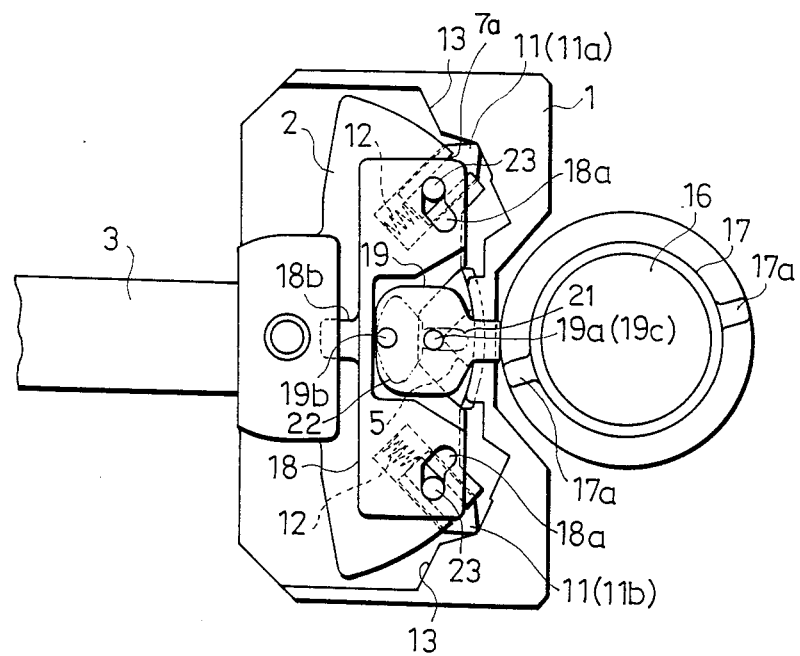

FIG. 1 is an exploded view of major parts of a turn indicator switch embodying the invention, FIG. 2 is a bottom view of a cover and cam member conjointed together for use in the turn indicator switch, and FIG. 3 is a plan view of the turn indicator switch affixed to a steering assembly. In these drawings, parts or members equal or similar to those of FIGS. 8 through 12 are designated by the same reference numerals.

Reference numeral 18 designates a slider having a pair of engage holes 18a. The slider 18 placed on the upper surface of the switch activating member 2, with its tongue member 18b being accepted in a recess 2a of the switch activating member 2. The engage holes 18a of the slider 18 accepts pins 23 projecting from the drive members 11 so that the pins 23 can move along guide grooves 7a extending above the blind holes 7 substantially along radial lines from the junction between the switch activating member 2 and the operating lever 3. The engage holes 18a of the slider 18 have a curved configuration shown in the drawings to partly overlap the guide grooves 7a.

Reference numeral 19 denotes a cam member having first and second projections 19a and 19b extending from the upper surface thereof and spaced by a predetermined distance in the back and forth direction. The cam member 19 also includes an engage pin 19c extending from the lower surface thereof coaxially with the first projection 19a. Reference numeral 20 designates a spring passing through the cam member 19. Reference numeral 21 refers to a straight guide groove formed in the upper surface of the cover 4, and 22 indicates a sectorial relief hole continuous from the guide groove 21. As shown in FIG. 2, the first projection 19a of the cam member 19 is accepted in the guide groove 21 whereas the second projection 19b is received in the relief hole 22. The cam member 19 is biased forwardly of the case 1 by the energy of the wire spring 20 fixed at both ends thereof to the cover 4. The other arrangement is basically equal to the prior art turn indicator switch, and redundant explanation is omitted here.

Next, an operation of the embodiment is hereinbelow explained, referring to FIGS. 3 through 7.

As shown in FIG. 3, when the operating lever 3 takes its neutral position, the cam member 19 is maintained at its withdrawal position against the energy of the wire spring 20 because the engage pin 19c on the bottom surface thereof engages the summit of the beveled cam 5, and the front end of the cam member 19 cannot project into the orbit of the projections 17a of the cancelling cam 17. Therefore, the cam member 19 is not operated regardless of rotation of the steering wheel in this configuration, and the operating lever 3 and the switch activating member 2 are held at their neutral positions by engagement of both drive members 11 with a valley portion of the cam 13 on the inner wall of the case 1.

Figure 4:
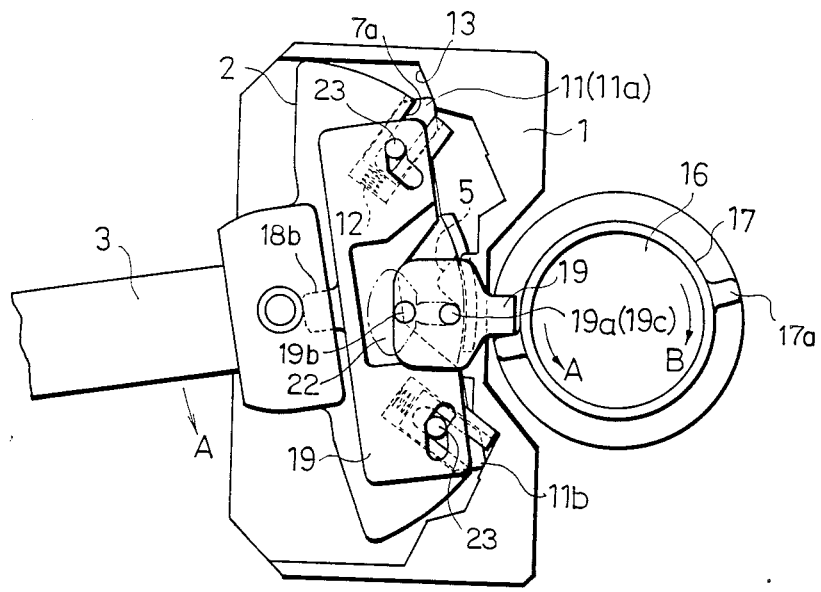

Referring to FIG. 4, when the operating lever 3 is rotated in arrow A direction, for example, from its neutral position, the upper drive member 11a moves beyond the summit toward another valley portion of the cam 13 against the energy of the spring 12, and the switch activating member 2 and the operating lever 3 are locked there. With this rotation of the switch activating member 2, a switch (not shown) provided below the switch activating member 2 is turned on to flash a left blinker. With the same rotation of the switch activating member 2, the positional relationship is changed between the stopper cam 5 of the switch activating member 2 and the cam member 19. Therefore, the wire spring 20 biases the cam member 19 to move the engage pin 19c away from the summit of the beveled cam 5 along one of side slopes thereof to partly expose the cam member from the front face of the case 1 into the orbit of the projections 17a, as shown in FIGS. 1 and 2.

Figure 5:
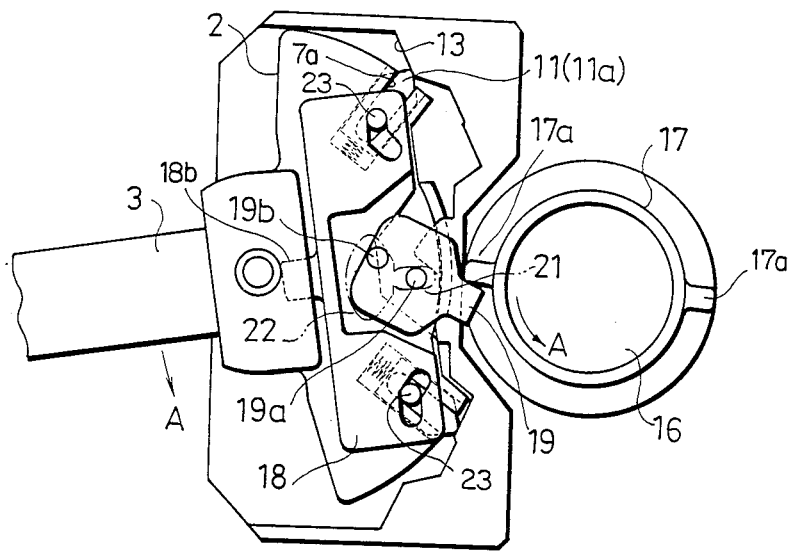

Referring to FIG. 5, when the steering shaft 16 is further rotated in the same direction as that of the operating lever 3, i.e. in the arrow A direction, one of the projections 17a of the cancelling cam 17 contacts and drives the bulging portion of the cam member 19 during the return motion. In this case, the first projection 19a of the cam member 19 moves along the guide hole 21 whereas the second projection 19b moves along the upper slope of the relief hole 22. Therefore, the cam member 19 retreats, not contacting the slider 18, and the switch activating member 2 and the operating lever 3 are maintained at their locked positions shown in FIG. 4.

Figure 6:
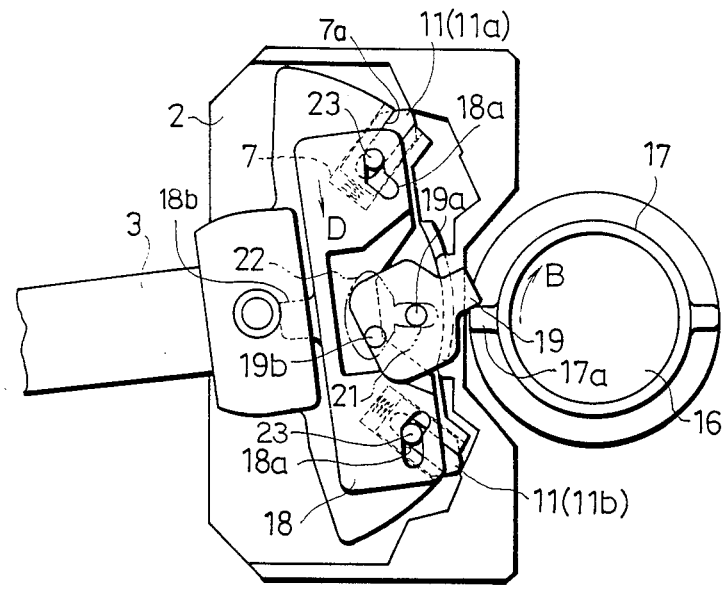
Figure 7:
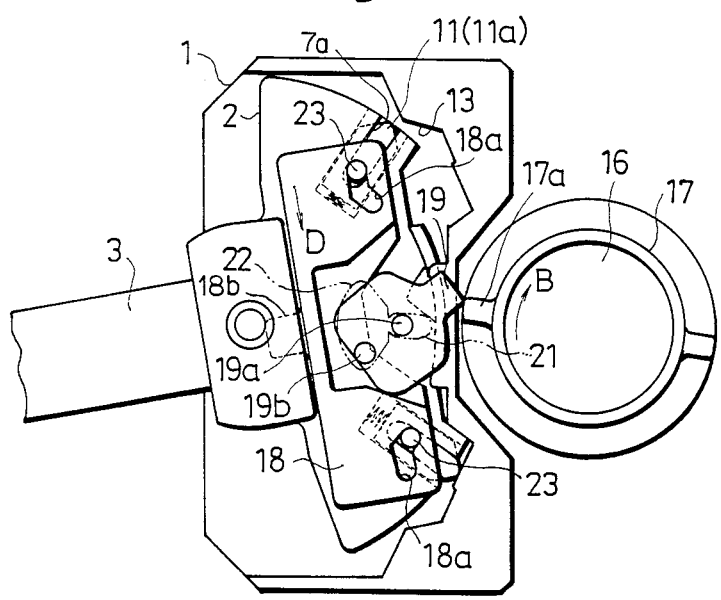
Figure 8:
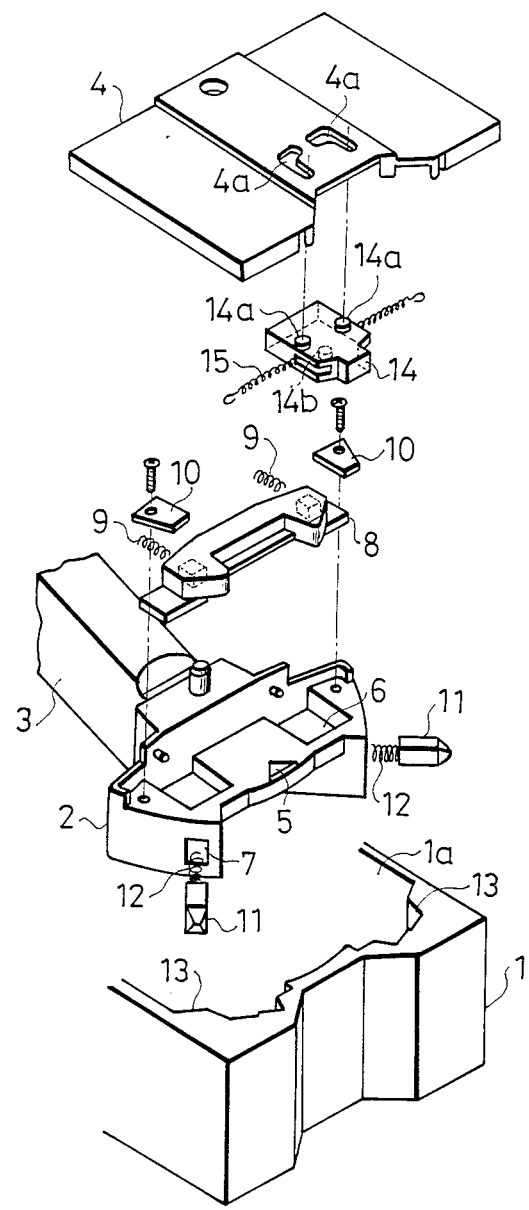
Figure 9:
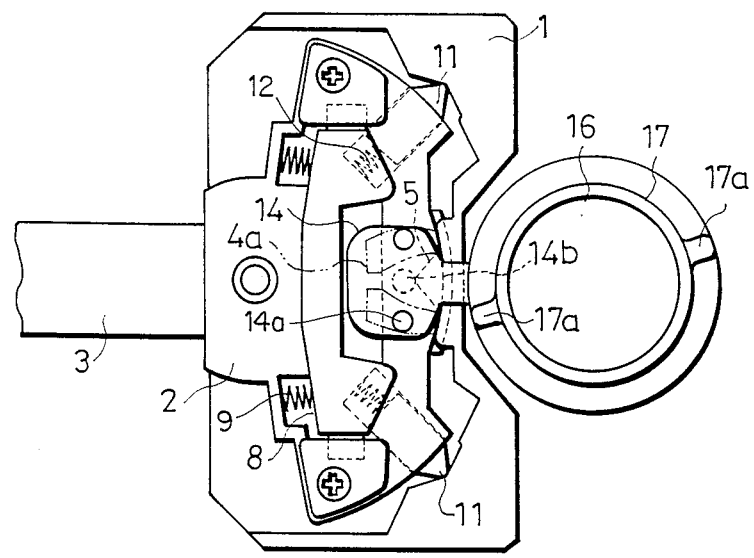
Figure 10:
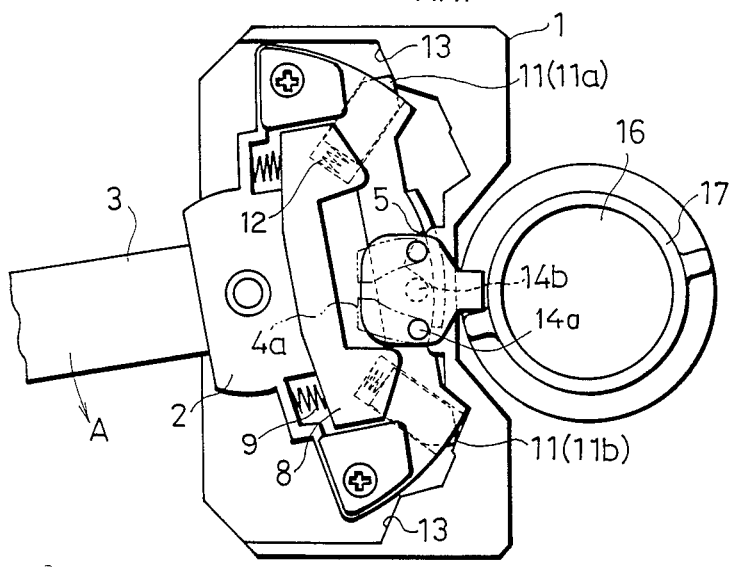
Figure 11:
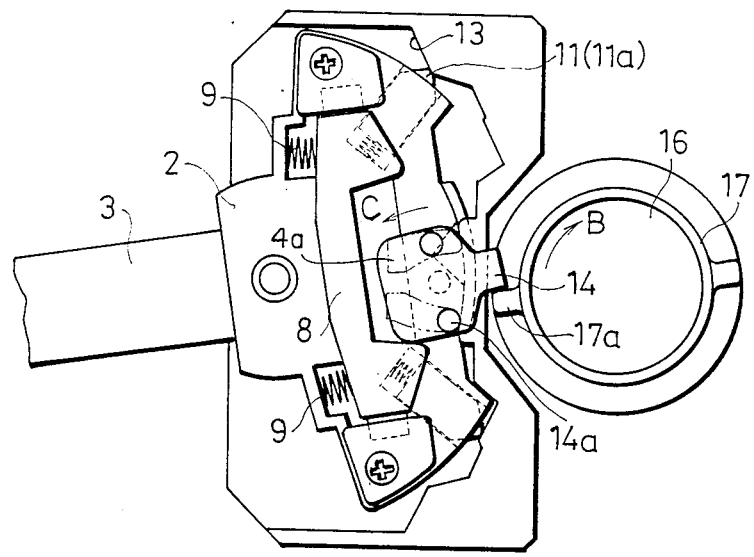
Figure 12:
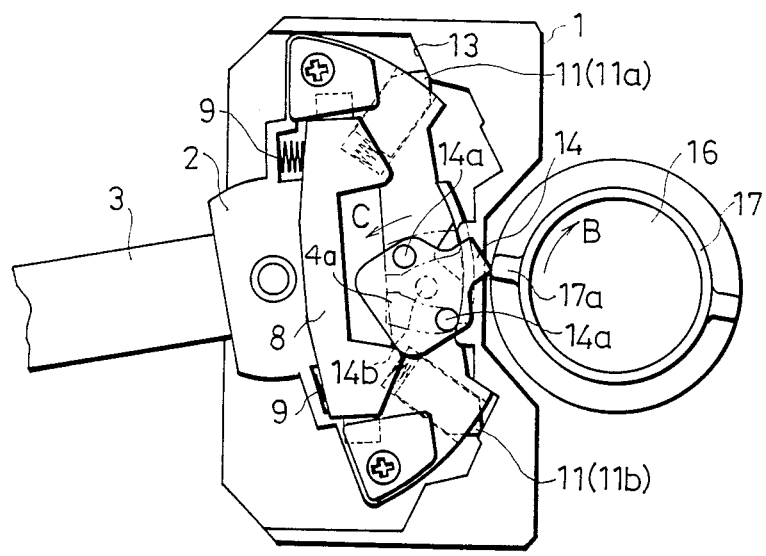

When the steering wheel returns from the position of FIG. 4 to its original position due to the caster effect, i.e. when the steering shaft 16 is rotated in arrow B direction in FIG. 6, one of the projections 17a of the cancelling cam 17 contacts and drives the bulging portion of the cam member 19 during the return motion. In this case, the first projection 19a of the cam member 19 moves along the guide hole 21 whereas the second projection 19b moves along the lower slope of the relief hole 22. Therefore, the cam member 19 contacts the slider 18 and moves it downwardly in the drawing in the arrow D direction. With this movement of the slider 18 in arrow D direction, the pin 23 on the upper drive member 11a moves, contacting one end of the engage hole 18a of the slider 18. Therefore, the drive member 11a withdraws in the blind hole 7 against the energy of the spring 12, bringing its end away from the cam 13. Due to this, the switch activating member 2 and the operating lever 3 automatically return to their neutral positions. With this return of the switch activating member 2, the engage pin 19c moves to the summit of the beveled cam 5 again, and the cam member 19 fully hides in the case 1 against the energy of the wire spring 20, and disengages from the projection 17a of the cancelling cam 17.

On the other hand, when the driver begins to return the steering wheel while holding the operating lever 3, i.e. when the steering shaft 16 rotates in arrow B direction of FIG. 4 due to the caster effect, the cam member 19 is first moved to the position of FIG. 6 by one of the projections 17a and drives the slider 18 in arrow D direction to forcibly enter the drive member 11a down the blind hole 7. Since the switch activating member 2 and the operating lever 3 are fixed by the driver, the first and second projections 19a and 19b of the cam member 19 withdraw to positions shown in FIG. 7 along the guide hole 21 and the lower slope of the relief hole 22 respectively.

In the described embodiment, since the pin 23 on the lower drive member 11b moves to the intersection between the curved engage hole 18a and the guide groove 7 during the cancelling operating, the lower drive member 11b itself is substantially immovable to significantly decrease a load caused by movement thereof.

When the projection 17a of the cancelling cam 17 moves beyond the cam member 19, the cam member 19 returns to its projecting position shown in FIG. 4 with the energy of the wire spring 20. Additionally, the slider 18 and the drive member 11 also return to positions of FIG. 4 with the energy of the spring 12. Therefore, the switch activating member 2 and the operating lever 3 are maintained at their locked positions.

In the aforegoing description, the left-turn blinker is flashed by rotating the operating lever 3 in arrow A direction. When the operating lever 3 is rotated in the opposite direction to flicker the right-turn winker, for example, the lower drive member 11b is locked at a position beyond a ridgeline of the cam 13.

Subsequent motions or operations are identical to the aforegoing explanation. In this case, however, the first and second projections 19a and 19b of the cam member 19 move along the guide hole 21 and the upper slope of the relief hole 22 respectively, and the slider 18 is moved in the opposite direction of arrow D.

With this arrangement, the movement of the cam member 19 driven by the cancelling cam 17 is directly transmitted to the drive member 11 via the slider 18. Therefore, engagement and disengagement between the drive member 11 and the cam 13 are reliably effected. Additionally, when the cancelling operation is effected while holding the operating lever 3, loads applied to the cancelling cam, cam member 19, slider 18, etc. are absorbed by contraction of the spring 12, and a reliable cancelling operation is performed. Further, since the slider 18 and the assembly of the drive member 11 and the spring 12 are united to the switch activating member 2 before they are mounted in the case 1, the drive member 11 never drops in the assembling process of the mechanism.

Beside this, since the first and second projections 19a and 19b of the cam member 19 move along the guide hole 21 and one slope of the relief hole 22 respectively when a cancelling operation is commenced while holding the operating lever 3, the slider 18 can be maintained substantially immovably to decrease loads applied to the cancelling cam 17 and the cam member 19. Further, since the movement area of the cam member 19 is smaller than in the prior art mechanism, an inexpensive wire spring 20 may be used as the resilient means for biasing the cam member 19.

In conclusion, since the invention arrangement is configured to activate the drive member via a slider driven by the cam member, the turn indicator switch cancelling mechanism reliably effects its cancelling operation and can be manufactured at a lower cost and in an easier manufacturing process.

What is claimed is:

1. A cancelling mechanism for a turn indicator switch comprising:
   a stationary casing having upper and lower cam surfaces on an inner wall surface thereof;
   a steering column disposed in a central position of the casing between the upper and lower cam surfaces on an opposite side of the casing from the inner wall surface, which is rotatable in either direction and is provided with a cancelling cam having cancelling projections rotatable along a rotational path with the steering column;
   an operating lever which is pivotable in upper and lower directions to upper and lower positions, respectively, from a neutral position thereof;
   a switch activating member mounted on an opposite end of the pivotable operating lever facing the inner wall surface of the casing, said switch activating member activating right and left turn indicating switches when it is pivoted by the operating lever in the upper and lower directions, respectively;
   upper and lower drive members each slidably held in a respective mounting hole formed in upper and lower parts of the switch activating member and biased in an outward direction of the hole to engage the upper and lower cam surfaces, respectively, of the casing, so as to hold the operating lever in the upper and lower positions when it is pivoted thereto, each of said drive members having a pin fixed thereon projecting above the switch activating member;

a slider plate mounted on the switch activating member so as to be slidably along horizontal directions between the steering column and the operating lever and biased by a spring in the horizontal direction toward the steering column, said slider plate having upper and lower engage means for movably retaining the respective pins of the drive members of the switch activating member;

a cam member movably and pivotably mounted in a center recess of the slider plate facing the steering column and biased by a spring toward the steering column, said cam member having a lower projection which is engageable with a center cam surface of the switch activating member when the operating lever is in the neutral position so that a front cam surface of the cam member is held out of the rotational path of the cancelling projections of the cancelling cam, and which is moved out of engagement with the center cam surface of the switch activating member when the operating lever is moved to the upper or lower positions such that the cam member is moved biasingly by the spring toward the steering column to interpose the front cam surface in the rotational path of the cancelling projections, wherein when the operating lever has been moved to an upper or lower position indicating a turn and the steering column is subsequently rotated, a cancelling projection engages the interposed front cam surface and deflects it out of the rotational path of the cancelling projections, said deflected cam member thereby abutting the center recess of the slider plate so as to deflect it in a restoring direction, said slider plate deflected in the restoring direction pulling by its engage means and the pin projected from the drive member located opposite to the deflection direction of the slider plate so as to retract said drive member from engagement with the corresonding cam surface of the casing in order to permit the operating lever and switch activating member to be restored to the neutral position.

2. A cancelling member according to claim 1, wherein said engage means are holes in which said pins are inserted, and slider plate is mounted on the switch activating member such that a rear tongue of the slider plate is movably retained in a concave portion of the switch activating member.

3. A cancelling member according to claim 1, wherein the pins of said drive members are slidable along guiding grooves extending into the mounting holes of the switch activating member.

4. A cancelling member according to claim 3, wherein said guiding grooves are oriented to extend radially toward a pivot axis of the operating lever and the switch activating member, and the engage holes of the slider plate are formed in an L-shape having a leg which intersects at an angle to the guiding grooves.

* * * * *